April 8, 1947. W. W. WILLARD 2,418,799
MECHANISM FOR INDICATING AZIMUTHAL MOVEMENT OF A PERISCOPE
Filed June 29, 1935 4 Sheets-Sheet 4

Inventor:
Waldo W. Willard,
Deceased,
By Cora B. Willard,
Executrix,
BY
HER ATTORNEY Patented Apr. 8, 1947

2,418,799

UNITED STATES PATENT OFFICE 2,418,799

MECHANISM FOR INDICATING AZIMUTHAL MOVEMENT OF A PERISCOPE

Waldo W. Willard, deceased, late of Schenectady, N. Y., by Cora Buck Willard, executrix, Schenectady, N. Y., assignor to Ford Instrument Company, Inc., Long Island City, N. Y., a corporation of New York Application June 29, 1935, Serial No. 29,080

13 Claims. (Cl. 88—69)

This invention relates to periscopes and more particularly to mechanism for indicating and/or transmitting the training or azimuthal movement of the extensible tube of a periscope which carries the optical elements.

In certain types of periscopes, the mechanism for this purpose includes a spline connection between the tube and the parts which partake of the training movement of the tube, in order that the tube may be moved longitudinally with respect to such parts which occupy a relatively fixed position. This arrangement requires that one or more longitudinal keyways be cut in the tube. If periscopes of this type be used on submarines there is the attending danger of leakage of water through the keyways unless special means be provided to obviate this danger. Another disadvantage attending the use of keyways in the tube is the weakening of its structure and the danger of distortion of its shape. Particularly is this the case with tubes formed of relatively thin metal.

It is a general object of this invention to overcome the above mentioned disadvantages by providing mechanism for indicating and/or transmitting the training movement of the tube of a periscope which avoids the necessity for removing any of the metal of the tube, as by the cutting of keyways.

According to the invention a stationary part of the periscope has movably mounted thereon a member which carries one or more rotatable elements engaging the tube and having their planes of rotation passing through the longitudinal axis of the tube, so that the friction between the elements and the tube will cause the former and the member on which they are mounted to turn with the tube in azimuth while permitting free longitudinal movement of the tube when it is raised or lowered. The member controls mechanism for indicating and/or transmitting the training movement of the tube. Mechanism is also provided for detecting and compensating for any possible slippage between the rotatable members and the tube as the latter is trained.

The particular nature of the invention as well as other advantages thereof will appear most clearly from a description of a preferred embodiment as shown in the accompanying drawings in which:

Fig. 3 is a similar view showing the appearance of the device as seen from a point located at right angles to the point from which Fig. 2 is viewed;

Figure 1:
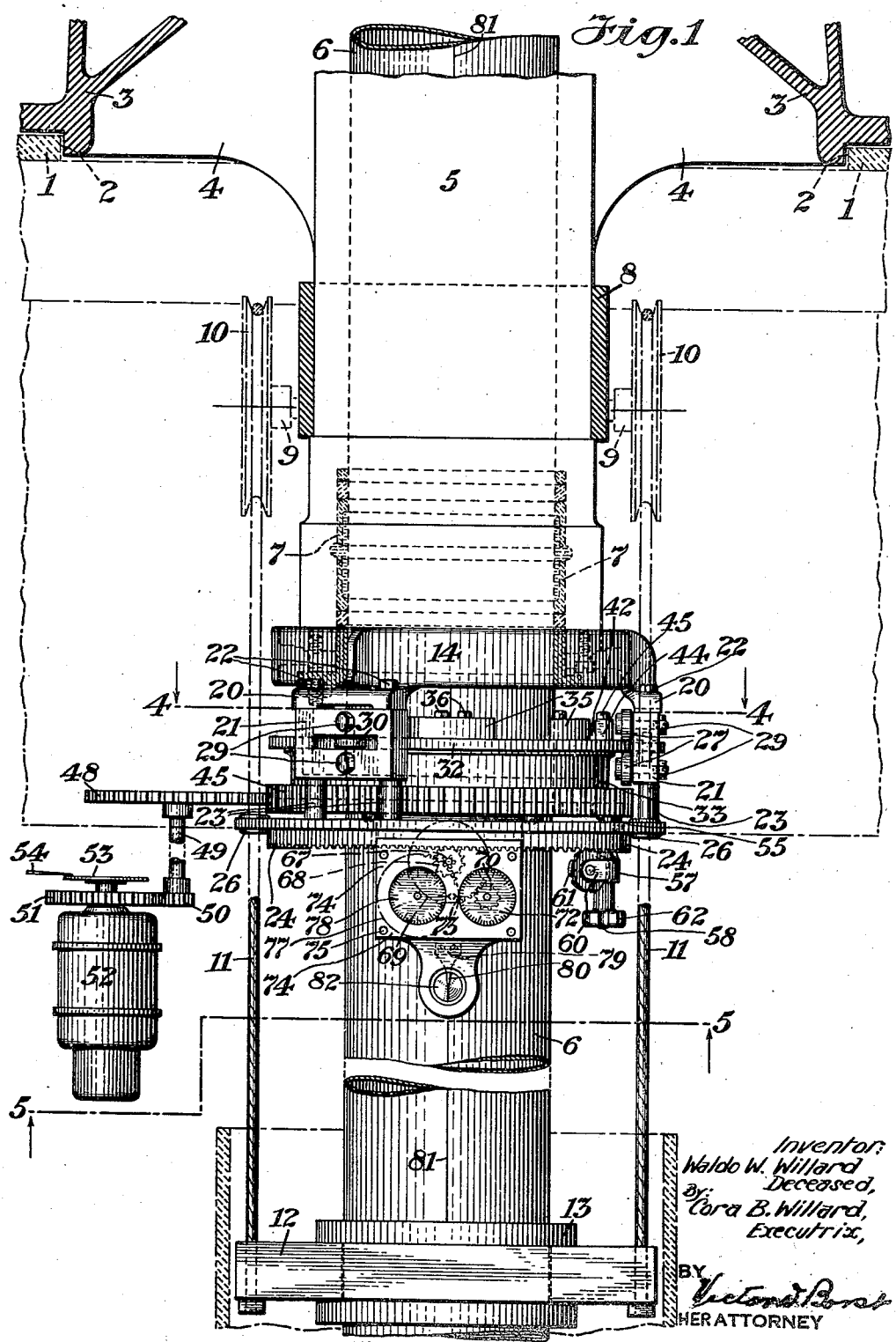
Fig. 1 is an elevation partly in section of a portion of a periscope with the invention applied thereto.

In the drawings, 1 designates a portion of the structure of the craft to which the periscope is applied, the structure being cut away to form an opening 2 for receiving a housing 3 of usual construction in this class of devices. The housing 3 is provided with a plurality of ribs 4 which merge into a cylindrical supporting member 5 within which is movably mounted an extensible tube 6 carrying the optical elements of the periscope. Packing 7 of any suitable type is placed between the member 5 and the tube 6 to prevent seepage of water between these parts. The supporting member 5 is provided with a ring 8 carrying the hubs 9 which carry pulleys 10 for the cables 11 forming part of the customary mechanism for raising or lowering the tube 6. The cables are attached at their lower ends to a member 12 within which is rotatably mounted a ring 13 attached to the tube, so that as the cables are operated the tube will be correspondingly raised or lowered.

Figure 2:
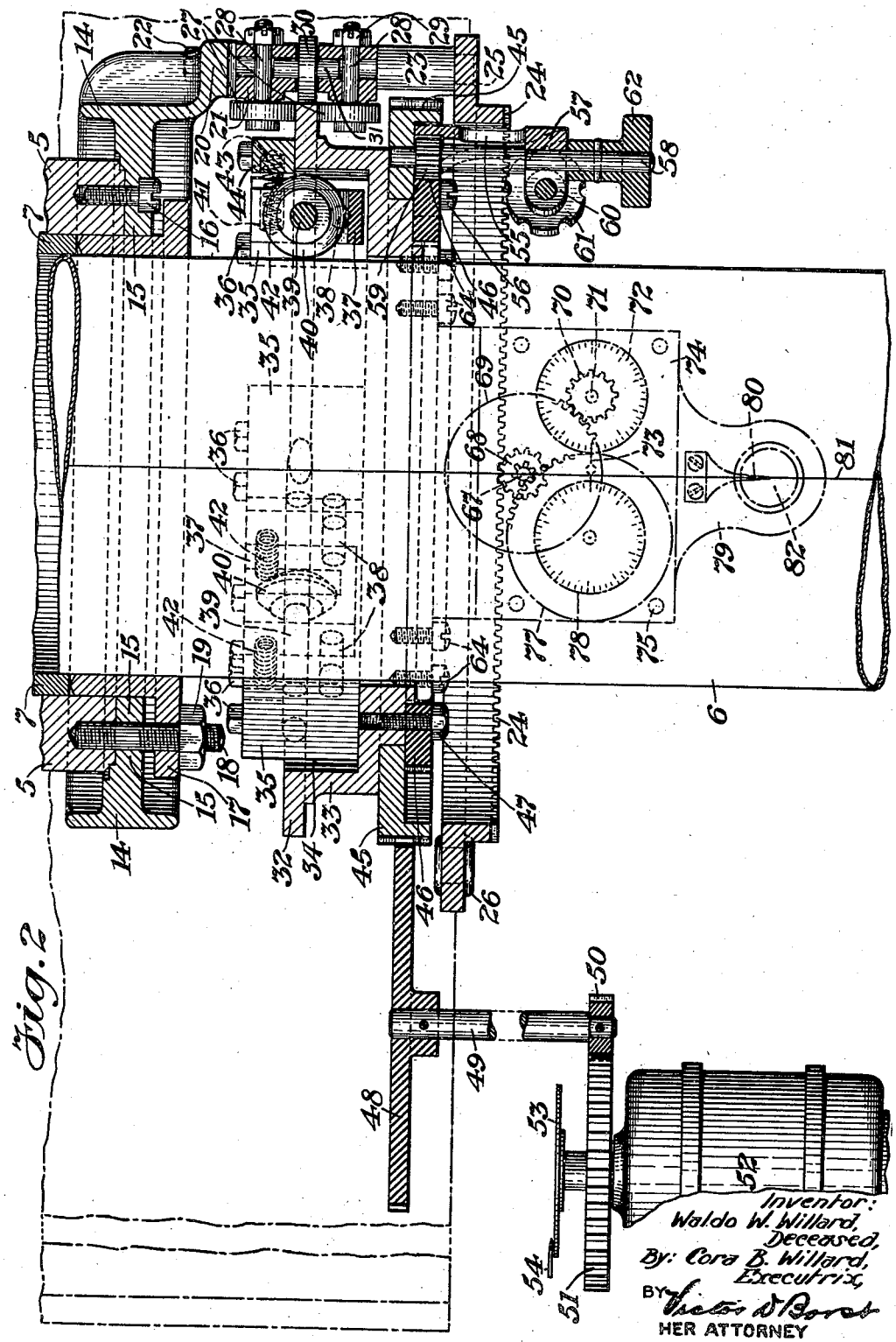
Fig. 2 is a similar view on an enlarged scale to show more clearly the details of the invention.

Referring particularly to Figure 2, an annular member 14 having an inwardly extending central web 15 is secured to the supporting member 5 by screws 16. An annular member 17 of L-shape in cross section is secured by bolts 18 passing through the web 15 and threaded into the lower end of the supporting member 5. The bolts are provided with nuts 19 for pressing the annular member 17 against the packing 7 to hold the latter tightly in place between the supporting member 5 and the tube 6.

Figure 4:
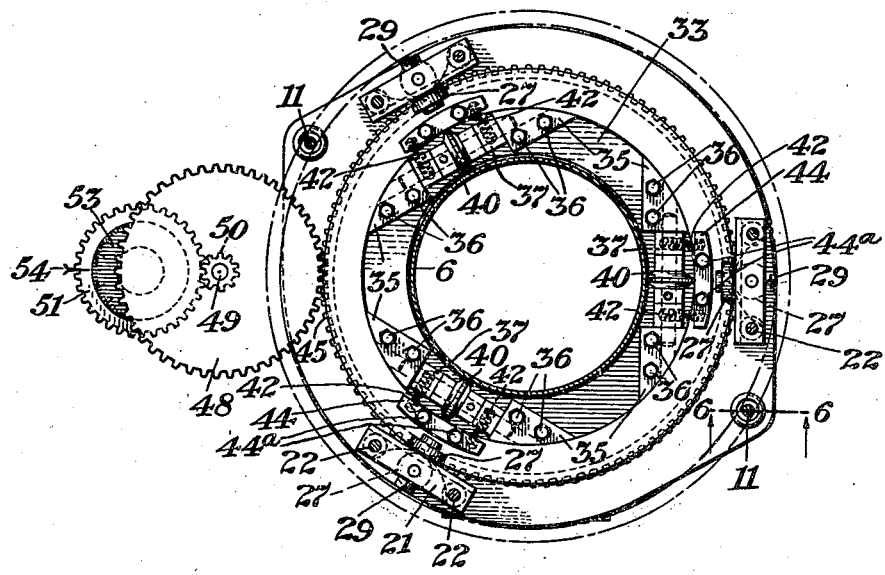
Fig. 4 is a transverse, sectional view taken along the line 4—4 of Fig. 1.

The annular member 14 is provided with three depending brackets 20 disposed at 120° apart, although any other number of brackets may be employed. A casing 21 is attached to each bracket by means of bolts 22 which pass through the casing and a spacing member 23 into a flange of a crown gear 24, the heads of the bolts being expanded as indicated at 25. As shown most clearly in Figures 4 and 5, the flange of the crown gear is extended at diametrically opposite points where it is provided with apertures 26 which serve as guides for the cables 11 which pass through them.

Each casing 21 carries a pair of rollers 27 having vertical planes of rotation. The rollers 27 are rotatably mounted on the ends of bolts 28 provided with nuts 29 for holding them in place in the casing 21. A roller 30 having a horizontal plane of rotation is mounted upon a vertically disposed shaft 31 mounted in the casing 21.

The rollers 27 engage opposite sides of a flange 32 forming part of an annular member 33 surrounding the tube 6 while the periphery of this flange is in engagement with the rollers 30. The annular member 33 is provided with a recessed portion 34 within which is mounted three pairs of blocks 35 held by bolts 36, as shown most clearly in Figure 4. Between each pair of blocks is a U-shaped frame 37 provided with trunnions 38 which extend into the blocks 35 to rotatably support the frame between the blocks. Between the arms of each U-shaped frame 37 is a shaft 39 which carries a roller 40 having its plane of rotation lying in a plane passing through the longitudinal axis of the tube 6, or in other words, the plane of rotation of the roller is radially disposed with respect to the tube. The upper ends of the arms of each U-shaped frame 37 are provided with recesses 41 for receiving one end of springs 42, the other ends of which are disposed within recesses 43 in a block 44 attached by screws 44a to the upper face of the flange 32 as shown most clearly in Figures 2 and 4. By virtue of this construction each roller is held against the tube 6 with a force determined by the characteristics of the springs.

As shown most clearly in Figure 2, an annular gear 45 is fitted within a recess in the bottom of annular member 33 and is adjustably held in the recess by means of an auxiliary annular gear 46 attached to the bottom of annular member 33 by means of screws 47. The annular gear 45 engages a gear 48 attached to the end of a shaft 49, the other end of which carries a pinion 50 coacting with a gear 51 attached to the rotatable element of an electrical transmitter 52 which is provided with a dial 52 readable against an index 54 to indicate the train of the tube of the periscope as will hereinafter more clearly appear.

Figure 3:
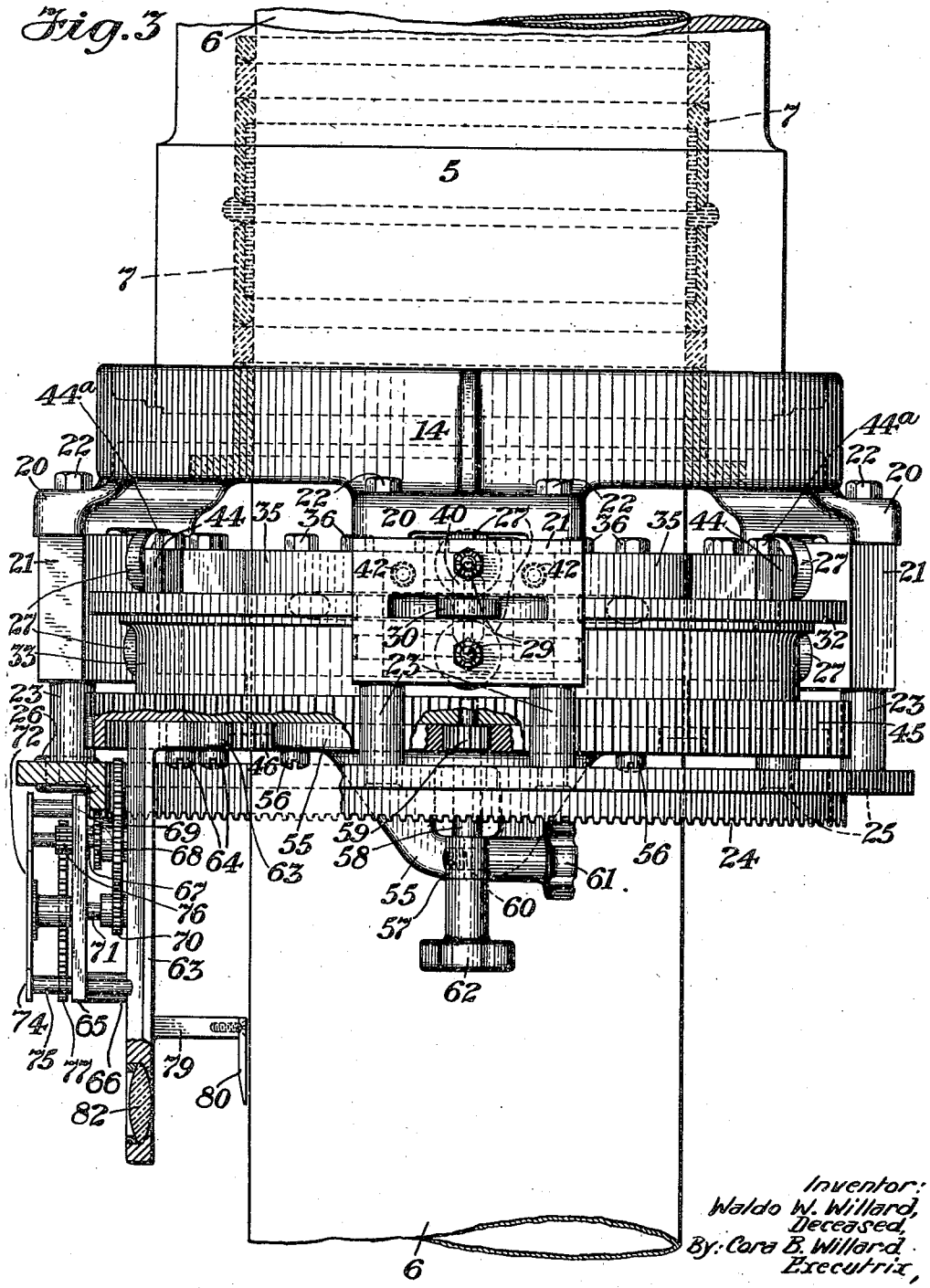

As shown most clearly in Figure 3, a bracket 55 is attached to the bottom of the annular gear 45 by screws 56. The lower end of the bracket, as shown most clearly in Figure 2, serves as a bearing 57 for the lower end of a shaft 58, the upper end of which extends into the annular gear 45. The central portion of the shaft 58 is of greater diameter to form a shoulder resting on the lower end of the bracket 55 to hold the shaft in place. The shaft also carries a pinion 59 engaging the auxiliary annular gear 46. The bearing 57 is split and provided with ears 60 adapted to be drawn together by a set screw 61 to clamp the shaft 58 in fixed position with respect to its supporting bracket under certain conditions of operation. The lower end of shaft 58 carries a knob 62 by which the shaft may be rotated under other conditions of operation.

Figure 5:
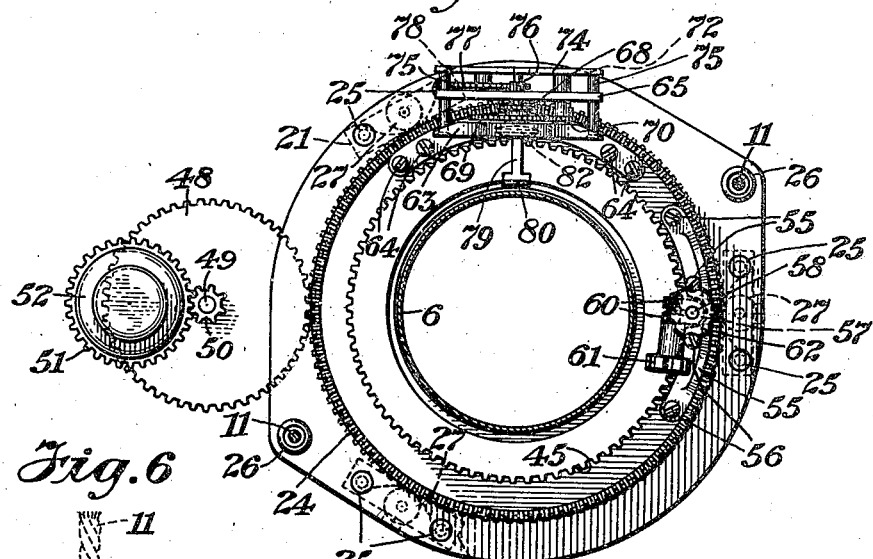
Fig. 5 is a similar view taken along the line 5—5 of Fig. 1.
Figure 6:
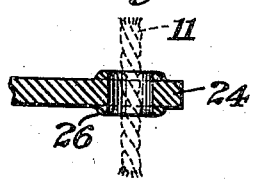
Fig. 6 is a sectional view of a detail of the device taken along the line 6—6 of Fig. 4.

As shown most clearly in Figure 5, a bracket 63 has an arcuate portion which is attached to the lower side of annular gear 45 by screws 64. The bracket has a depending portion having an arcuate face to which a frame 65 is attached by posts 66 as most clearly shown in Figure 3. A shaft 67 passing through the frame 65 carries a pinion 68 which meshes with the crown gear 24. A gear 69 associated with the pinion 68 engages a pinion 70 on a shaft 71 mounted in the frame 65 and carrying a high speed dial 72 reading against an index 73 on a plate 74 supported by posts 75 attached to the frame 65. The shaft 67 is also provided with a pinion 76 engaging a gear 77 rotatably mounted on the frame 65 and carrying a low speed dial 78 reading against the index 73, it being understood that the dials are suitably graduated in units of angular measure as is customary in indicators of the type shown herein.

The lower end of bracket 63 carries an arm 79 provided with a pointer 80 coacting with a line 81 scribed on the tube 6 and longitudinally arranged. To aid in viewing the pointer and the line on the tube a lens 82 is mounted in an aperture at the bottom of the bracket 63.

In the operation of the apparatus described above the tube 6 may be raised or lowered in relation to its supporting member 5 by suitable manipulation of the mechanism provided for this purpose and which constitutes no part of the present invention. Due to the rollers 40 being carried upon the supporting member 5 and their arrangement relatively to the tube 6 the relative movement between the member and the tube as the latter is raised or lowered will be accompanied by free rotation of the rollers between the arms of the U-shaped members 37 on which they are mounted. Under these conditions there will be relatively slight friction interposed to the longitudinal movement of the tube.

When however the tube 6 is rotated relatively to the member 5 within which it is mounted, the friction between the rollers 40 and the tube, assuming the spring 42 to be properly designed, will cause the rollers to follow the training movement of the tube, since there will be no rolling friction between the tube and the rollers under these conditions. The motion thus imparted to the rollers by the tube will cause corresponding movement of the annular member 33 upon which the rollers are mounted, the member turning freely within the pairs of rollers 27 and being maintained concentric with the tube by the rollers 30. The member 33 will carry with it the annular gear 45 which is held fixed to the member by the auxiliary annular gear 46 and screws 47.

The movement of the annular gear 45 will be transmitted by gear 48, shaft 49, pinion 50 and gear 51 to the movable element of the transmitter 52 from which the data will be sent to receivers located at points where it is desired to receive information regarding the train of the periscope. Since the bracket 63 and the parts mounted thereon are attached to the annular gear 45 they will be carried with the gear as the latter moves with the rollers 40 while the tube 6 is being trained. The crown gear 24 will remain fixed so that as the bracket 63 moves with the gear 45, the pinion 68 on the bracket will be rotated by virtue of its engagement with the crown gear. The coarse and fine dials 78 and 72 respectively will be turned by virtue of the gear connections from the pinion 68 to show at the periscope its angle of train.

The foregoing description of the operation of the apparatus has been based upon the assumption that no slippage between the tube 6 and the rollers 40 occurs as the former is trained. Provision is, however, made for detecting such slippage and compensating for it. It is for this purpose that the pointer 80 and line 81 on the tube 6 are provided. Since the pointer is carried on the bracket 63 which in turn is carried on the annular gear 45 which moves with the rollers 40 and the line 81 is placed on the tube, any departure of the pointer from the line indicates a lack of uniformity between the motion of the tube and the parts movable with the rollers as the latter are dragged by the tube. This slippage will produce errors in the output of the transmitter 52 and in the indications of the dials 72 and 78.

Upon detecting slippage in the apparatus the screws 47 are loosened to free the annular gear 45 from its normally fixed relation to the annular member 33. The screw 61 is then turned to release the shaft 58 from its clamped condition in the bracket 55. The shaft is then turned by manipulation of knob 62. As the shaft turns, the pinion 59 thereon travels around the auxiliary gear 46 since this gear is restrained from angular displacement by the screws 47 which enter the annular member 33 which is also restrained from such movement by the friction between the rollers and the tube. The upper end of shaft 58 will therefore displace the annular gear 45 relatively to the annular member 33 since the screws 47 have been loosened to permit such movement. This operation is continued until the pointer 80 associated with the annular gear 45 is brought into coincidence with the line 81 on the tube 6. Since the dials 72 and 78 and their driving mechanism are mounted upon the bracket 63 which is attached to the annular gear 45 the correctional adjustment of the latter relatively to the fixed crown gear 24 will through pinion 68 and the gear trains driven therefrom alter the positions of the dials to correct for their erroneous displacement due to slippage between the tube 6 and the rollers 40. Likewise the correctional adjustment of gear 45 will through the gear train leading to transmitter 52 apply a corresponding adjustment to the latter to remove the error in the reading of its dial due to slippage.

After the correcting operation has been performed the screws 47 will be tightened to clamp the gear 45 to the annular member 33. The screw 61 will also be set to clamp the shaft 58 in its supporting bracket 55 thus restoring the apparatus to normal operating conditions.

It will be apparent that various changes may be made by those skilled in the art in the details of the embodiment illustrated in the drawings and specifically described above within the scope and principle of the invention as expressed in the appended claims.

What is claimed is:

1. In a periscope having a stationary member within which a tube is mounted for linear displacement along a central longitudinal axis and rotary displacement about said longitudinal axis, the combination of a member mounted on the stationary member for movement about said longitudinal axis of the tube, a rotatable element mounted on the second member and so disposed that said longitudinal axis of the tube lies in the plane of rotation of the element, means for holding the element in engagement with the tube with sufficient friction to cause the element and the second member on which it is mounted to partake of the rotary displacement imparted to the tube, and mechanism responsive to the resultant movement of the second member to indicate the rotary displacement of the tube with respect to the stationary member within which it is mounted.

2. In a periscope having a stationary member within which a tube is mounted for linear displacement along a central longitudinal axis and rotary displacement about said longitudinal axis, the combination of a member mounted on the stationary member for movement about said longitudinal axis of the tube, a plurality of rotatable elements mounted on the second member and so disposed that the said longitudinal axis of the tube lies in the planes of rotation of the elements, means for holding the elements in engagement with the tube with sufficient friction to cause the elements and the second member on which they are mounted to partake of the rotary displacement imparted to the tube, and mechanism responsive to the resultant movement of the second member to indicate the rotary displacement of the tube with respect to the stationary member within which it is mounted.

3. In a periscope having a stationary member within which a tube is mounted for linear displacement along a central longitudinal axis and rotary displacement about said longitudinal axis, the combination of a member mounted on the stationary member for movement about said longitudinal axis of the tube, a rotatable element mounted on the second member and so disposed that said longitudinal axis of the tube lies in the plane of rotation of the element, means for holding the element in engagement with the tube with sufficient friction to cause the element and the second member on which it is mounted to partake of the rotary displacement imparted to the tube, mechanism responsive to the resultant movement of the second member to indicate the rotary displacement of the tube with respect to the stationary member within which it is mounted, means for indicating slippage between the tube and the element when the tube is rotated, and means for compensating for such slippage.

4. In a periscope having a stationary member within which a tube is mounted for linear displacement along a central longitudinal axis and rotary displacement about said longitudinal axis, the combination of a member mounted on the stationary member for movement about said longitudinal axis of the tube, a roller mounted on the second member and so disposed with respect to the tube as to offer rolling friction to longitudinal displacement of the tube and sliding friction to rotary displacement of the tube, means for holding the roller in engagement with the tube with sufficient sliding friction to cause the roller and the second member on which it is mounted to partake of the rotary displacement imparted to the tube and mechanism responsive to the resultant movement of the second member to indicate the rotary displacement of the tube with respect to the stationary member within which it is mounted.

5. In a periscope having a stationary member within which a tube is mounted for linear displacement along a central longitudinal axis and rotary displacement about said longitudinal axis, the combination of a member mounted on the stationary member for movement about said longitudinal axis of the tube, a roller mounted on the second member and so disposed with respect to the tube as to offer rolling friction to longitudinal displacement of the tube and sliding friction to rotary displacement of the tube, means for holding the roller in engagement with the tube with sufficient sliding friction to cause the roller and the second member on which it is mounted to partake of the rotary displacement imparted to the tube, mechanism responsive to the resultant movement of the second member to indicate the rotary displacement of the tube with respect to the stationary member within which it is mounted, means for indicating slippage between the tube and the roller when the tube is rotated, and means for compensating for such slippage.

6. In a periscope having a stationary member within which a tube is mounted for linear displacement along a central longitudinal axis and rotary displacement about said longitudinal axis, the combination of a plurality of casings attached to the stationary member, a rotatable element mounted in each casing, a member surrounding the tube and rotatably supported on the rotatable elements, a plurality of rotatable elements mounted on the second member and so disposed that said longitudinal axis of the tube lies in the planes of rotation of the second named rotatable elements, means for holding the second named rotatable elements in engagement with the tube with sufficient friction to cause the second named rotatable elements and the second member on which they are mounted to partake of the rotary displacement imparted to the tube, and mechanism responsive to the resultant movement of the second member to indicate the rotary displacement of the tube with respect to the stationary member within which it is mounted.

7. In a periscope having a stationary member within which a tube is mounted for linear displacement along a central longitudinal axis and rotary displacement about said longitudinal axis, the combination of a plurality of casings attached to the stationary member, a rotatable element mounted in each casing, a member surrounding the tube and rotatably supported on the rotatable elements, a second rotatable element mounted in each casing and engaging the second member for maintaining it concentric with respect to the tube, a plurality of rotatable elements mounted on the second member and so disposed that said longitudinal axis of the tube lies in the planes of rotation of the third named rotatable elements, means for holding the third named rotatable elements in engagement with the tube with sufficient friction to cause the third named rotatable elements and the second member on which they are mounted to partake of the rotary displacement imparted to the tube, and mechanism responsive to the resultant movement of the second member to indicate the rotary displacement of the tube with respect to the stationary member within which it is mounted.

8. In a periscope having a stationary member within which a tube is mounted for linear displacement along a central longitudinal axis and rotary displacement about said longitudinal axis, the combination of a member mounted on the stationary member for movement about said longitudinal axis of the tube, a rotatable element mounted on the second member and having its plane of rotation radially disposed with respect to the tube, means for holding the element in engagement with the tube with sufficient friction to cause the element and the second member on which it is mounted to partake of the rotary displacement imparted to the tube, and mechanism responsive to the resultant movement of the second member to indicate the rotary displacement of the tube with respect to the stationary member within which it is mounted.

9. In a periscope having a stationary member within which a tube is mounted for linear displacement along a central longitudinal axis and rotary displacement about said longitudinal axis, the combination of a member mounted on the stationary member for movement about said longitudinal axis of the tube, a rotatable element mounted on the second member and so disposed that said longitudinal axis of the tube lies in the plane of rotation of the element, means for holding the element in engagement with the tube with sufficient friction to cause the element and the second member on which it is mounted to partake of the rotary displacement imparted to the tube, a gear adjustably attached to the second member, an auxiliary gear connected to the second member, a bracket attached to the adjustable gear, a shaft mounted in the bracket and having a pinion engaging the auxiliary gear, the adjustable gear being provided with an aperture for receiving one end of the shaft, means for clamping the shaft with respect to the bracket in which it is mounted, and mechanism responsive to the resultant movement of the second member to indicate the rotary displacement of the tube with respect to the stationary member within which it is mounted.

10. In a periscope having a stationary member within which a tube is mounted for translational and rotational movement, the combination of a member rotatably mounted on said stationary member, rotatable means frictionally engaging the tube, the said rotatable means being mounted on said second mentioned member for rotation about transverse axes to permit free translational movement of the tube but to drive the second mentioned member by friction to partake of any rotary displacement imparted to the tube, and means responsive to any rotational movement of the second mentioned member for indicating the rotary displacement of the tube with respect to the stationary member within which it is mounted.

11. In a periscope having a stationary member within which a tube is mounted for translational and rotational movement, the combination of a member movably mounted on said stationary member, rotatable means frictionally engaging the tube and subject to slippage, the said means being mounted on said second mentioned member in a manner not to interfere with translational movement of the tube but in a manner to cause the second mentioned member to partake of any rotary displacement imparted to the tube, means responsive to any movement of the second mentioned member for indicating the rotary displacement of the tube with respect to the stationary member within which it is mounted, and means for compensating for any detected slippage between the tube and the first mentioned means.

12. In a periscope having a stationary member within which a tube is mounted for translational and rotational movement, the combination of a member rotatably mounted on said stationary member, rotatable means frictionally engaging the tube and subject to slippage, the said means being mounted on said second mentioned member in a manner not to interfere with translational movement of the tube but in a manner to cause the second mentioned member to partake, except for said slippage, of any rotational movement imparted to the tube, a ring member mounted on the second mentioned member, means to impart rotational movement of the second mentioned member to the ring member, and means for adjusting the rotational relation of the ring member to the second mentioned member to compensate for said slippage between the tube and the second mentioned member, whereby the ring member occupies a predetermined rotational position relative to the tube.

13. In a periscope having a stationary member within which a tube is mouned for translational and rotational movement about a longitudinal axis, the combination of a member mounted on said stationary member for rotational movement about said axis, a plurality of rotatable elements mounted on the second mentioned member and so disposed that the said axis lies in the planes of rotation of the elements, means for holding the elements in engagement with the tube with sufficient friction to cause the second mentioned member to partake of the rotational displacement imparted to the tube, a ring member mounted for rotational movement about said axis, means to impart rotational movement of the second mentioned member to the said ring member, and means for adjusting the rotational position of the ring member relative to the second mentioned member.

CORA BUCK WILLARD.
*Executrix of the Estate of Waldo W. Willard, Deceased.*

REFERENCES CITED

The following references are of record in the file of this patent:

UNITED STATES PATENTS

| Number | Name | Date |
| --- | --- | --- |
| 1,313,534 | Hoffman | Aug. 19, 1919 |
| 1,332,209 | Ford | Mar. 2, 1920 |
| 725,570 | Lake | Apr. 14, 1903 |
| 725,839 | Grubb | Apr. 21, 1903 |
| 1,175,609 | Cottrell | Mar. 14, 1916 |
| 954,707 | Spear | Apr. 12, 1910 |